Figure 6:
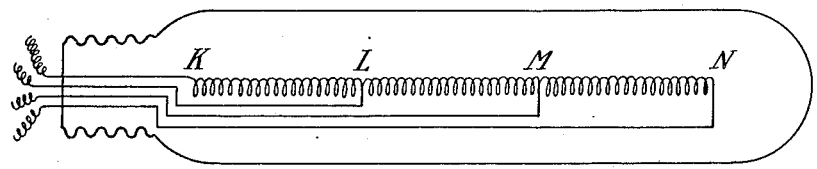

July 31, 1934.    G. HEYMER    1,968,145
PROCESS AND DEVICE FOR PRINTING MULTICOLOR
PARTIAL PICTURES ON LENTICULAR FILMS
Filed Dec. 8, 1931    3 Sheets-Sheet 1
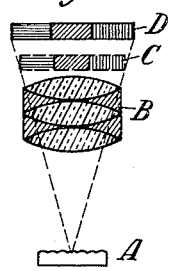
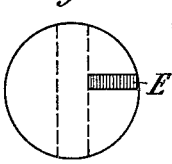
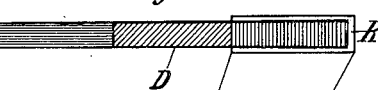
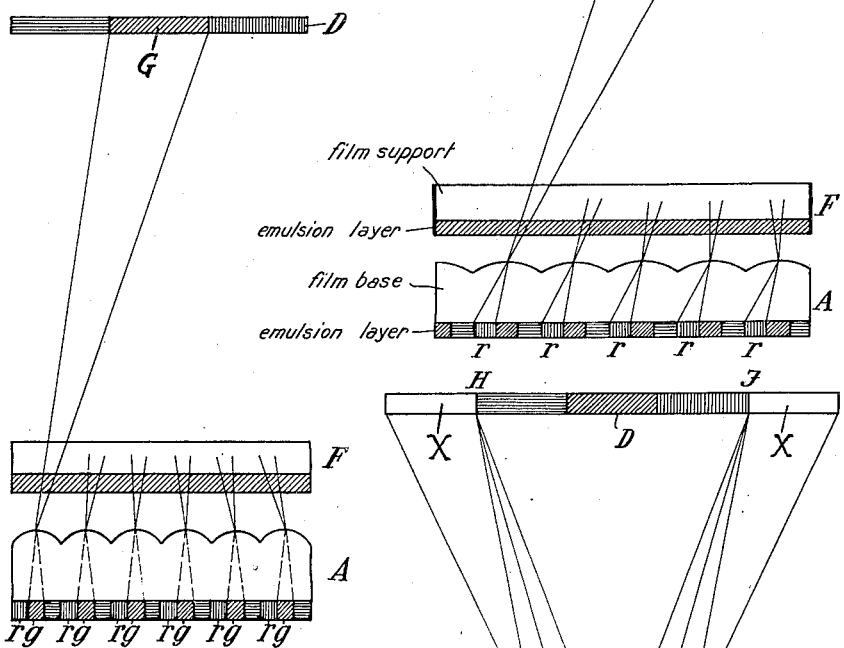
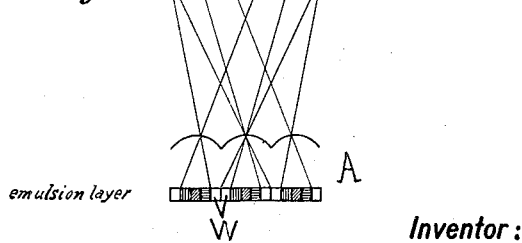
Inventor:
Gerd Heymer,
By Attorney
Philip S. Hopkins.

July 31, 1934.                G. HEYMER                  1,968,145
              PROCESS AND DEVICE FOR PRINTING MULTICOLOR
                 PARTIAL PICTURES ON LENTICULAR FILMS
                       Filed Dec. 8, 1931         3 Sheets-Sheet 2

Inventor:
Gerd Heymer,
By   Attorney
Philip S. Hopkins.

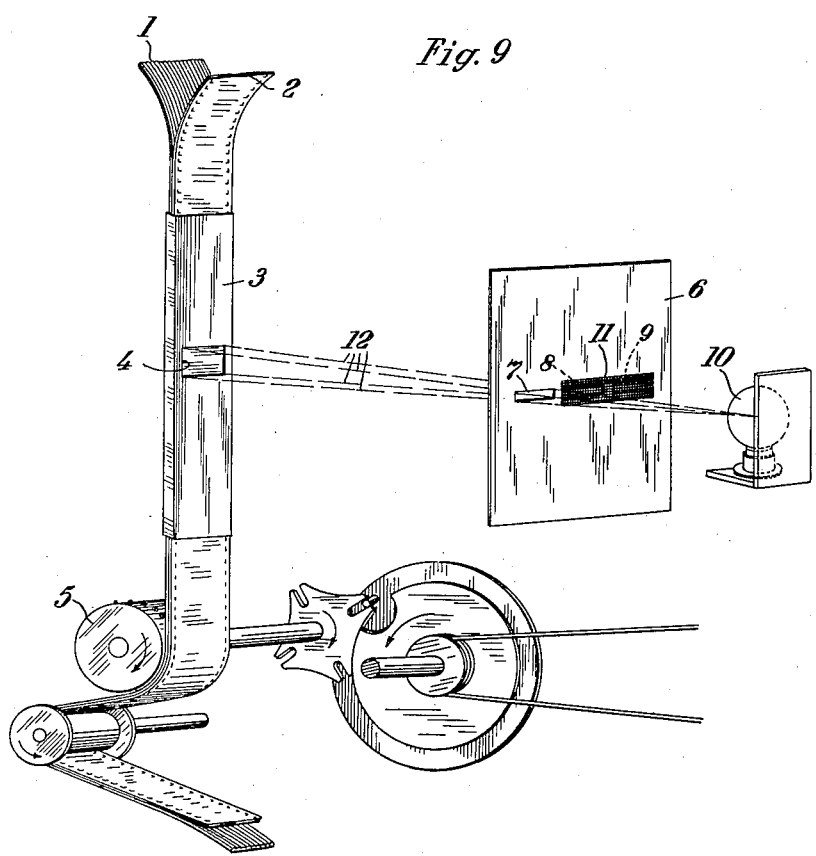

Patented July 31, 1934

1,968,145

UNITED STATES PATENT OFFICE 1,968,145

PROCESS AND DEVICE FOR PRINTING MULTICOLOR PARTIAL PICTURES ON LENTICULAR FILMS

Gerd Heymer, Dessau, Germany, assignor to Agfa Ansco Corporation, Binghamton, N. Y., a corporation of New York Application December 8, 1931, Serial No. 579,748
In Germany December 10, 1930

12 Claims. (Cl. 95—75)

My present invention relates to printing of multi-color partial pictures on lenticular films.

One of its objects is to provide a process for contact printing of multi-color partial pictures on lenticular films. An additional object is the device for the purpose set forth. Further objects will be seen from the detailed specification following hereafter.

My process consists in placing the corresponding partial color records of a multi-color picture taken on ordinary film (that is to say, the partial color records which together form a group containing all the color sensations required for producing a single picture in colors), one after the other on the side of the lenticular film bearing the lenticular elements in exactly the same position and illuminating the pictures from this side the direction of incidence of the light being altered so that it is different in the case of each one of a group of corresponding partial color records, and care being taken that the corresponding pictures of each group of pictures are projected on the same picture place of the lenticular film.

For this purpose it is necessary to provide the printing apparatus with catches which engage the perforations of the film to be printed and those of the lenticular film, whereby it becomes possible to register each one of a group of corresponding partial pictures of the film to be printed one after the other on one and the same area of the lenticular film. In printing cinematographic picture bands, the perforation for this purpose is already available. If single pictures taken in an ordinary photographic apparatus are to be printed on a printing material having lenticular embossings, the partial color sensations and the printing material have to be provided with cuts or perforations which correspond exactly with one another and must be made to register during the printing operation. If required the perforations may be replaced in known manner by indentations.

The printing light is supplied by a special illuminating device provided either with incandescent lamps or illuminated discs of frosted glass of a determined breadth. The breadth depends upon the form of the lenticular embossings of the printing material and upon the kind of objective which serves for the projection of the printed picture and corresponds to the breadth of one area of the multi-color filter, or the virtual image thereof, which is to be used in the projecting operation.

If the refracting elements of the printing material consist, as usual, of parallel cylindrical lenses, the dimensions of the several sources of light of the illuminating system in the direction parallel to the cylindrical lenses must be kept as small as possible, whereas the dimensions in the direction perpendicular to the lenticular elements (that is the breadth) are determined as aforesaid. The dimension of the source of light in a direction perpendicular to that of the lenticular elements depends upon the properties of the objective with which the print to be produced is to be projected. The distances of the optical centres of the different sources of light from one another and from the picture window of the printing device should be as nearly as possible equal to the distances of the optical centres of the color stripes of the virtual image of the multi-color filter from one another and from the lenticular film during the projection. An exact observation of these conditions will, however, only be possible in some special cases, because the projection objectives in use have varying focal lengths, and because it is important that the print should be applicable, if possible, in all projection apparatus that enter into consideration. For these reasons the said conditions are fulfilled only approximately, by equalizing as much as possible the aforesaid distances, while printing and projecting. Experience has shown that also in this case a very satisfactory reproduction or rendering of the colors is obtained. It is advantageous either to choose for the distances indicated mean values, or to take the greatest of the values in question for the distance of the virtual filter image from the film and the smallest value for the distances between the optical centres of the stripes of the projection filter, and to determine the size of the illuminating device accordingly. If there are greater differences in the focal lengths and apertures of the projection objectives intended to be used for purposes of reproduction the second of the two methods indicated is followed. If films printed in this manner are to be projected by means of projection apparatus of differing sizes, it is necessary to fulfill the conditions underlying the printing operation as to the distance and the breadth of the filter, by suitably adjusting the optical means in the projection apparatus, in a manner analogous to that shown in Fig. 8 of the accompanying drawings.

For the distance of the virtual filter image during the projection if desired, there can be adopted the value $\infty$. If it is not possible to arrange the several sources of light of the illuminating device within a sufficiently narrow space, there can be intercalated between the film and the illuminating devices lenses which project the virtual images of the sources of light at the required distances.

The dimension of the several sources of light in the directions perpendicularly to the lenticular elements is chosen so that the source of light corresponding with one partial color has at most only the dimension of the corresponding partial color of the multi-color to be employed during the projection. It is, however, advantageous that the sources of light be smaller in dimensions, for instance, punctiform, and that they be placed in the optical centres of the areas in question. It is advisable to arrange the sources of light in a movable manner so that the whole system can rapidly and simply be adapted to any alteration of the conditions.

It is also possible to use an illuminating device consisting only of a single source of light which is movable in such a manner that it takes successively the position of each of the sources of light of the illuminating device above described.

The intensity of the illumination is controlled in known manner by inserting resistances in the lighting current, intercalating media adsorbing light such as grey filters, color filters, wire nets, or the like in the path of the beams or masking the luminous planes of the several sources of light.

According to the process of the invention there can be printed negatives as well as positives onto lenticular film. In order to obtain a print which is not laterally inverted, it is necessary that the negative should be placed on the printing material with its back side next the lenticular elements thereof, and that the positive is placed on the printing material with its layer side next the lenticular elements. If it is desired that also in printing a negative the layer side thereof should be placed on the embossed side of the printing material, in which case a laterally inverted picture would result, it is necessary either, during the photographing of the negative, to expose the light-sensitive layer thru the support or to insert one of the known systems for inverting pictures, or, during the projection, to use a system for inverting pictures or to view the projected picture from behind the projection screen.

If the lenticular elements of the printing material are chosen so that the picture elements, projected by the different lenticular elements in the sensitive layer, are not directly contiguous, but are separated from one another by empty spaces, it is necessary, in order to prevent the colors from whitening, additionally to illuminate each picture area either prior to or during or after printing the partial color pictures of a group, by means of luminous stripes running parallel to the direction of the lenticular embossing. By this additional illumination the unexposed parts lying between the single pictures of the lenticular film are blackened. The distance and the breadth of the luminous stripes are chosen in such a manner that only those parts of the emulsion layer are struck by the light which are situated outside the picture field of the partial color pictures.

It has proved to be particularly advantageous first to produce from the partial color records to be printed, intermediate positives on a film having no lenticular elements, to print these positives on the lenticular film with their layer side next to the lenticular embossing, and to develop the latent picture produced on the lenticular film, to a positive according to the known reversal method. This arrangement is more favorable for the sharpness of the print, since the layer side is turned towards the lenticular embossing and the additional illumination above referred to by means of the source of light consisting of several stripes is no longer necesasry, since all unexposed parts which may be present between the single pictures, have already been blackened by the reversal method.

It is advisable to produce the intermediate positives on a film having a very flat gradation and to dye the emulsion layer of the lenticular film with an inactinic, that is, a dyestuff which has no sensitizing effect on the silver halide emulsion for instance, a yellow filter dyestuff, in order to maintain the resolving power as high as possible.

Figure 7:
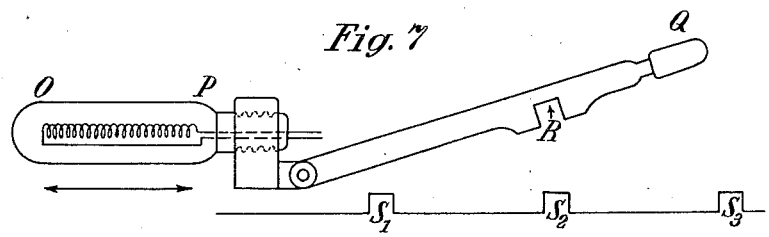
Figure 8:
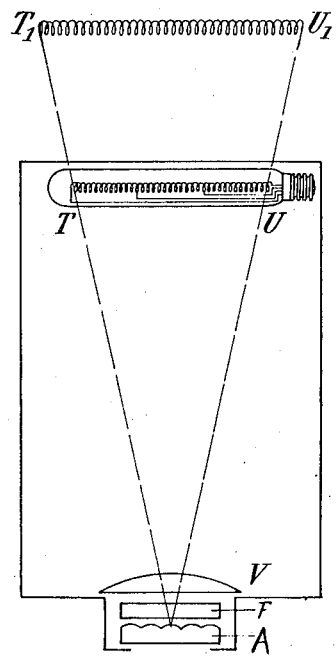

The invention is illustrated with reference to the accompanying drawings in which:

Fig. 1 illustrates diagrammatically an arrangement as used in projecting a lenticular film, Fig. 2 represents a multi-color filter used in projecting a lenticular film, showing at the same time a slit used for the exposure in the printing operation, Fig. 3 shows diagrammatically the printing of the red sensation, Fig. 4 shows diagrammatically the printing of the green sensation, Fig. 5 shows diagrammatically the exposure of the unexposed parts between the partial pictures which lie behind the lenticular elements, Fig. 6 illustrates diagrammatically an illuminating device, Fig. 7 shows diagrammatically another form of an illuminating device, Fig. 8 represents diagrammatically an arrangement used if the available length of the copying machine is smaller than the distance of the virtual image of the multi-color filter from the lenticular film, Fig. 9 represents diagrammatically a perspective view of an arrangement for printing according to this invention.

Referring to Fig. 1 A is the lenticular film, B the objective and C the multi-color filter used when projecting the lenticular film. When viewing the filter C from the lenticular film A thru the objective B, the filter itself cannot be seen, but its virtual image is seen at D. The multi-color filter may consist of three parallel stripes, a red stripe, a green stripe and a blue stripe, the virtual image D of the multi-color filter will be the basis for the further explanations, since as will be seen from the description this virtual image indicates the place at which the source of light should be placed in my printing process.

Fig. 2 represents the multi-color filter used in projecting the lenticular film bearing the print and consisting of three parallel stripes. E is the slit of the diaphragm R shown in Fig. 3. In order to obtain a sharp print this slit is made as small as possible.

Fig. 3 illustrates diagrammatically the first step in the printing operation. The positive film F bearing a positive made from a negative to be copied is advantageously placed with the side bearing the image in contact with the lenticular film A. The reproduction of the positive film bearing, in the present case, the red color sensation of the picture is effected by a distinct arrangement and by a distinct size of the diaphragm R provided with a slit, and placed at a distance from the film A corresponding to that of the virtual image of the multi-color filter in taking a picture on a lenticular film. The distance AD therefore corresponds to the distance AD in Fig. 1. Owing to the lenticular elements of the lenticular film the opening E (see Fig. 2) of the diaphragm R is copied at the places $r$, the luminosity in copying being determined by the brightness of the partial color positive F.

Fig. 4 represents diagrammatically the printing of the green extract of the picture. For this step the diaphragm must be inserted at G corresponding to the green area of the virtual image D of the multi-color filter. The single points of the picture are copied on the lenticular film A at $g$.

In a completely analogous manner the blue color sensation may be printed upon the lenticular film.

Fig. 5 represents diagrammatically the process of exposing the spaces which may remain unexposed in the printing operations. HI is the breadth of the virtual image D (cf. Fig. 1) of the multi-color filter or more correctly, the breadth of the diaphragm placed at HJ thru which the exposure is made in the printing operation. On examination of the real pictures registered on the emulsion layer of the lenticular film A, it may be found that spaces W remain on which no light has fallen. After development these spaces are transparent and may cause a whitening of the colors in reproduction. In order to avoid this drawback, adjacent to each side of the virtual image D of the multi-color filter there is provided a slit for illumination which is made so broad in the direction perpendicular to the lenticular elements that the real images of the slits projected on the layer of the lenticular film touch each other as shown in Fig. 5 or slightly overlap. This method is, however, only used for lenticular films which are not developed according to the reversal process.

Fig. 6 shows diagrammatically a source of light which may replace the diaphragm R (cf. Fig. 3) provided with a slit. The source of light is an incandescent lamp having a wire spiral KLMN which corresponds in length to the virtual image D (cf. Fig. 1) of the multi-color filter. The points L and M correspond to the lines separating the three color stripes of the multi-color filter. The electric connections in the lamp are such that each of the three parts KL, LM and MN of the wire spiral can be switched on or off at will and that only that part of the wire is illuminated which is wanted for copying the actual partial color negative.

Figure 7 illustrates diagrammatically another mode of illumination. The source of light is an incandescent lamp provided with a single wire spiral having a length OP corresponding to the breadth of one area of the virtual image D (cf. Fig. 1) of the multi-color filter. The lamp can be displaced laterally so that it illuminates the desired section, the sections corresponding to the parts KL, LM and MN of Fig. 5. The lamp is fixed in the different positions for illuminating each section by a lever Q having a ratchet Y which engages projecting bosses $S_1$, $S_2$ and $S_3$ mounted on a fixed base.

Fig. 8 represents diagrammatically an arrangement used if the available length of the copying machine is smaller than the distance of the virtual image D of the multi-color filter from the lenticular film. In this case the source of light is placed at the place of the copying machine marked TU and a virtual image of the source of light is formed at $T_1U_1$ by the lens V so that the distance A—$T_1U_1$ corresponds to the distance A—D in Fig. 1. In this manner the film is exposed in the same manner as if the source of light itself were at $T_1U_1$.

In Fig. 9, which shows diagrammatically a perspective view of an arrangement for printing according to this invention, the lenticular film 1 and the ordinary film 2 are guided in contact thru the gate 3 having an aperture 4. The films are advanced together by the sprocket drum 5 of the intermittent film feeding device. The wall 6 prevents other light than that wanted for the printing operation from striking the films to be printed. In the wall 6 there are provided discs 7, 8, and 9 of frosted glass which may be illuminated by the incandescent lamp 10. These discs are arranged at a distance and position from the lenticular film corresponding to that of the areas of the multi-color filter (in the present case a three-color filter) or the virtual image thereof, to be used in projecting the lenticular film. Each partial color sensation record is printed with another disc, the remaining discs being masked. In Fig. 9 there is shown the way of the light rays coming from disc 7 by the dotted lines 12, the two other discs 8 and 9 being masked by the shutter 11.

What I claim is:—

1. A process of printing on a lenticular film by contact partial color sensation records taken on ordinary film which comprises placing said partial color records corresponding with one another, one after the other in exactly the same position on the side of the lenticular elements of said lenticular film, illuminating said films from the side of the lenticular elements by means of a source of light positioned at a distance from the lenticular film corresponding to that of the multi-color filter to be used in projection or its virtual image and having a breadth corresponding to that of one color area of said multi-color filter or its virtual image and altering the direction of incidence of the light for printing each of said partial color records.

2. A process of printing on a lenticular film by contact partial color sensation records taken on ordinary film which comprises placing said partial color records corresponding with one another, one after the other with their rear side in exactly the same position on the side of the lenticular elements of said lenticular film, illuminating said films from the side of the lenticular elements by means of a source of light positioned at a distance from the lenticular film corresponding to that of the multi-color filter to be used in projection or its virtual image and having a breadth corresponding to that of one color area in said multi-color filter or its virtual image and altering the direction of incidence of the light for printing each of said partial color records.

3. A process of printing on a lenticular film by contact partial color sensation records taken on ordinary film which comprises placing said partial color records corresponding with one another, one after the other with their rear side in exactly the same position on the side of the lenticular elements of said lenticular film, illuminating said films from the side of the lenticular elements by means of a source of light positioned at a distance from the lenticular film corresponding to that of the multi-color filter to be used in projection or its virtual image and having a breadth corresponding to that of one color area of said multi-color filter or its virtual image and altering the direction of incidence of the light for printing each of said partial color records, and illuminating unexposed parts between the partial pictures lying behind the different lenticular elements.

4. A process of printing on a lenticular film by contact partial color sensation records taken on ordinary film which comprises producing on ordinary film positives from partial color negatives, placing said positive partial color records corresponding with one another, one after the other with their layer side in exactly the same position on the side of the lenticular elements of said lenticular film, illuminating said films from the side of the lenticular elements by means of a source of light positioned at a distance from the lenticular film corresponding to that of the multi-color filter to be used in projection or its virtual image and having a breadth corresponding to that of one color area of said multi-color filter or its virtual image and altering the direction of incidence of the light for printing each of said partial color records, and illuminating unexposed parts between the partial pictures lying behind the different lenticular elements.

5. A process of printing on a lenticular film by contact partial color sensation records taken on ordinary film which comprises producing on ordinary film having a flat gradation positives from partial color negatives, placing said positive partial color records corresponding with one another, one after the other with their layer side in exactly the same position on the side of the lenticular elements of said lenticular film, illuminating said films from the side of the lenticular elements by means of a source of light positioned at a distance from the lenticular film corresponding to that of the multi-color filter to be used in projection or its virtual image and having a breadth corresponding to that of one color area of said multi-color filter or its virtual image and altering the direction of incidence of the light for printing each of said partial color records, and illuminating unexposed parts between the partial pictures lying behind the different lenticular elements.

6. A process of printing on a lenticular film by contact partial color sensation records taken on ordinary film which comprises placing said partial color records corresponding with one another, one after the other in exactly the same position on the side of the lenticular elements of said lenticular film, illuminating said films from the side of the lenticular elements by means of a source of light positioned at a distance from the lenticular film corresponding to the mean value of the distance of the different multi-color filters or the virtual images thereof to be used in projecting the lenticular film, from said film if objectives of varying focal length are to be employed in projection, and having a breadth equal to the mean value of the breadths of one color area of the different multi-color filters, or the virtual images thereof, and altering the direction of incidence of the light for printing each of said partial color records.

7. A process of printing on a lenticular film by contact partial color sensation records taken on ordinary film which comprises placing said partial color records corresponding with one another, one after the other in exactly the same position on the side of the lenticular elements of said lenticular film, illuminating said films from the side of the lenticular elements by means of a source of light positioned at a distance from the lenticular film corresponding to the greatest distance of the different multi-color filters, or the virtual images thereof, to be used in projecting the lenticular film, from said film if objectives of varying focal length are to be employed in projection, and having a breadth equal to the narrowest breadth of one color area of the different multi-color filters, or the virtual images thereof, and altering the direction of incidence of the light for printing each of said partial color records.

8. In an apparatus for printing on a lenticular film by contact partial color sensation records taken on ordinary film in operative combination, means for guiding a lenticular film and a smooth film in contact, and means for illuminating said films from a distance and position corresponding to the distance and position of that filter area of the multi-color filter or its virtual image to be used in projecting the film, which has the color of the sensation to be printed.

9. In an apparatus for printing on a lenticular film by contact partial color sensation records taken on ordinary film in operative combination, means for guiding a lenticular film and a smooth film in contact, and an illuminating device comprising a number of sources of light which number corresponds to that of the areas of the multi-color filter used in the projection of the lenticular film, said sources of light being individually controllable and adapted to the breadth of the multi-color filter or the virtual image thereof to be used in projecting the lenticular film, the distances of the sources of light from each other and the lenticular film being equal to the distances of the areas of the multi-color filter or the virtual image thereof to be used in projecting the lenticular film, from each other and the lenticular film.

10. In an apparatus for printing on a lenticular film by contact partial color sensation records taken on ordinary film in operative combination, means for guiding a lenticular film and a smooth film in contact, an illuminating device comprising one single source of light corresponding in breadth to one area of the multi-color filter or the virtual image thereof to be used in projecting the lenticular film, and means allowing to place the source of light successively in different places corresponding in distance and position to those of the areas of the multi-color filter or the virtual image thereof to be used in projecting the lenticular film.

11. In an apparatus for printing on a lenticular film by contact partial color sensation records taken on ordinary film in operative combination, means for guiding a lenticular film and a smooth film in contact, an illuminating device comprising a number of sources of light which number corresponds to that of the areas of the multi-color filter to be used in the projection of the lenticular film, and between the lenticular film and the sources of light an optical means cooperating with said illuminating device so as to project a virtual image of the sources of light to places which correspond in distance and position to those of the areas of the multi-color filter or the virtual image thereof to be used in projecting the lenticular film.

12. In an apparatus for printing on a lenticular film by contact partial color sensation records taken on ordinary film in operative combination, means for guiding a lenticular film and a smooth film in contact, and an illuminating device comprising a number of sources of light which number corresponds to that of the areas of the multicolor filter to be used in the projection of the lenticular film, said illuminating device being arranged at a distance from the lenticular film smaller than that of the multi-color filter or the virtual image thereof to be used in projecting the lenticular film from said film, and between the lenticular film and the sources of light a convex lens cooperating with said illuminating device so as to project a virtual image of the sources of light to places which correspond in distance and position to those of the areas of the multi-color filter or the virtual image thereof to be used in projecting the lenticular film.

GERD HEYMER.